us009088804B2

United States Patent
Feher et al.

(10) Patent No.: US 9,088,804 B2
(45) Date of Patent: Jul. 21, 2015

(54) ON-DEMAND SELECTION OF TRANSCODING FORMATS FOR MULTIMEDIA BROADCAST STREAMS

(75) Inventors: Gyula Feher, Budapest (HU); Akos Gyimesi, Budapest (HU); Zoltan Ponekker, Szabadbattyan (HU); Daniel Palffy, Budaors (HU); Gergely Hodicska, Budapest (HU); Zoltan Nemeth, Budapest (HU)

(73) Assignee: Ustream, Inc., San Francisco, CA (US)

( * ) Notice: Subject to any disclaimer, the term of this patent is extended or adjusted under 35 U.S.C. 154(b) by 311 days.

(21) Appl. No.: 13/592,161

(22) Filed: Aug. 22, 2012

(65) Prior Publication Data

US 2013/0054827 A1   Feb. 28, 2013

Related U.S. Application Data

(60) Provisional application No. 61/527,485, filed on Aug. 25, 2011, provisional application No. 61/562,377, filed on Nov. 21, 2011.

(51) Int. Cl.
| | |
|---|---|
| *G06F 15/16* | (2006.01) |
| *H04N 21/2343* | (2011.01) |
| *H04L 29/06* | (2006.01) |
| *H04N 21/258* | (2011.01) |

(52) U.S. Cl.
CPC .. *H04N 21/234336* (2013.01); *H04L 29/06455* (2013.01); *H04L 29/06503* (2013.01); *H04N 21/25833* (2013.01); *H04L 29/06489* (2013.01)

(58) Field of Classification Search
CPC ................................................ H04L 29/06503
USPC .................................................... 709/230, 231
See application file for complete search history.

(56) References Cited

U.S. PATENT DOCUMENTS

| | | | |
|---|---|---|---|
| 7,340,765 B2 | 3/2008 | Feldmeier | |
| 2004/0045030 A1* | 3/2004 | Reynolds et al. | 725/110 |
| 2007/0022206 A1* | 1/2007 | Pope et al. | 709/231 |
| 2013/0024901 A1* | 1/2013 | Sharif-Ahmadi et al. | 725/114 |

* cited by examiner

*Primary Examiner* — Wing F Chan
*Assistant Examiner* — Andrew Woo
(74) *Attorney, Agent, or Firm* — Fenwick & West LLP

(57) ABSTRACT

An on-demand multimedia stream processing system receives multimedia streams from broadcasters and processes the streams for viewing on a wide range of client devices. To decrease the use of computing resources, processing jobs are started and stopped based on user demand. When a multimedia stream is received from a broadcaster, the processing system does not start processing the multimedia broadcast stream until a request for a processed stream is received. The processing system automatically terminates processing jobs when the audience of a processed stream drops to zero or some other stop condition is met.

19 Claims, 7 Drawing Sheets

ON-DEMAND SELECTION OF TRANSCODING FORMATS FOR MULTIMEDIA BROADCAST STREAMS

CROSS REFERENCE TO RELATED APPLICATIONS

This application claims the benefit of U.S. Provisional Application No. 61/527,485, filed Aug. 25, 2011, and U.S. Provisional Application No. 61/562,377, filed Nov. 21, 2011, which are incorporated by reference in their entirety.

BACKGROUND

1. Field of Art

The disclosure generally relates real-time multimedia streaming, and more particularly to transcoding real-time multimedia streams.

2. Description of the Related Art

Mobile electronic devices have rapidly evolved from single-purpose tools for communication or music playback into robust computing systems that have a wide range of multimedia capabilities. In addition to viewing multimedia content pre-loaded on the device's memory, the availability of high-speed network connections on these portable devices has made it possible for users to receive multimedia broadcast streams. To maintain their market share and their popularity among users, multimedia streaming providers provide a way for their user audience to display streaming multimedia content on a wide range of client devices, such as smartphones, portable media players, game consoles, tablet computers, and traditional desktop computers.

One major challenge of providing streaming multimedia content to such a diverse range of client devices is the significant differences in computing and graphics performance, screen resolution, compatible transportation protocols, and supported multimedia formats between devices. For example, a high bit rate and high resolution live video stream may provide a desirable user experience on a desktop computer, but the same stream would experience significant difficulties with the limited connection speed, computing capabilities, and multimedia format support on most smartphones. To enhance compatibility with different types of client devices, a multimedia streaming provider must be able to deliver multimedia streams in multiple formats and bitrates over multiple transportation protocols.

The process used to convert multimedia streams into multiple formats and bitrates uses a significant amount of computing power that is not available to most broadcasters, so the conversion process needs to be performed server-side by the multimedia streaming provider. However, existing methods of server-side stream conversion do not have a method of selecting multimedia formats based on user demand, which leads to a waste of computer resources as the server generates converted streams that are not sent to any users. The significant resources used for server-side stream conversion have prevented it from being implemented on a large scale, making it difficult for users on a diverse range of devices to watch a multimedia stream from any broadcaster that must rely on the multimedia streaming provider to perform the stream conversion.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
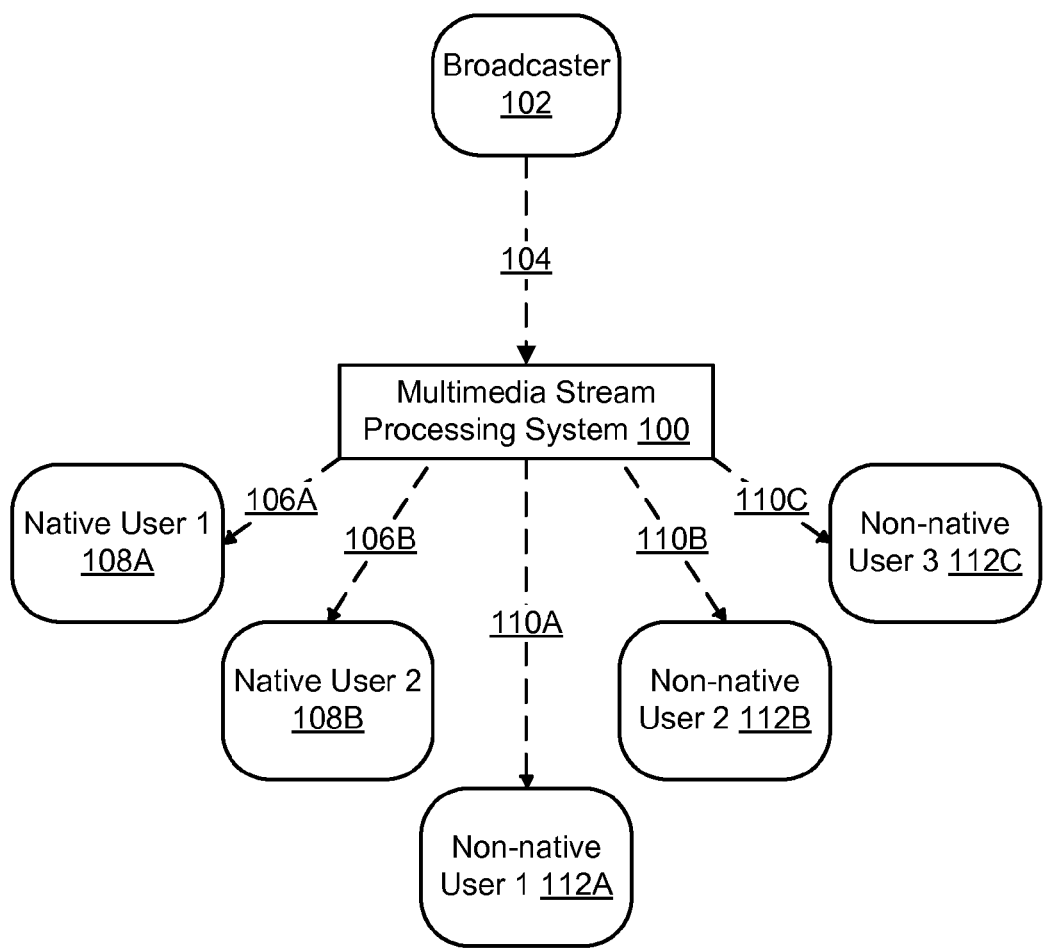
FIG. 1 is a block diagram illustrating a multimedia stream processing system interacting with a broadcaster and multiple users, according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Embodiments relate to establishing a multimedia stream processing system that receives multimedia streams from broadcasters and processes the streams on-demand for viewing on a wide range of client devices. Processing jobs are started and stopped based on user demand in order to reduce hardware costs and avoid waste of computing resources. In other words, when a multimedia broadcast stream is received from a broadcaster, the processing system does not start processing the multimedia broadcast stream until a user requests a processed stream. The processing system automatically terminates processing jobs when the viewership of a processed stream drops to zero or some other stop conditions are met.

As used herein, processing refers to two separate processes that the processing system performs on a multimedia broadcast stream. A first category of processing is the transcoding of the stream in a first format into a second format. The other format may be suitable for a targeted client device. The second format may differ in terms of various multimedia settings. The first format and the second format may also be referred to as a native format and a non-native format, respectively. A second category of processing is the packetizing of the stream into a playlist of short packets for transmission to the client device over a transfer protocol.

As used herein, multimedia settings refer to any properties of a multimedia stream that may affect the ability of a client device to reproduce the stream. Multimedia settings may include, among other things, the encoding/decoding scheme, bit rate, resolution, and frame rate. Multimedia settings may also affect the performance of a client device while the device is reproducing the stream. For example, a portable client device such as a smart-phone or tablet computer may be subject to more limiting power and processing constraints than a non-portable device like a desktop computer, so a portable device may not perform as well as a non-portable device when reproducing a stream with a higher bit rate or resolution.

Overview of Logical Architecture

FIG. 1 is a block diagram illustrating a simplified interaction between an on-demand multimedia stream processing system 100, a broadcaster 102, and several native users 108 and non-native users 112, according to one embodiment. After the broadcaster 102 connects to the processing system 100, the processing system 100 receives a multimedia stream 104 in a native format from the broadcaster 102. There is typically a group of native users 108 who are able to view the broadcaster's multimedia stream 104 in the native format. The processing system 100 recognizes these native users 108 and sends the native multimedia stream 106 to the native users 108 before the stream undergoes any additional processing. The processing system 100 also receives requests for the multimedia stream 104 from non-native users 112 who are not able to view the multimedia stream 104 in its native format. For these non-native users 112, the processing system 100 transcodes the broadcaster's original multimedia stream 104 into a format that can be played back on the non-native users' 112 client devices, packetizes the transcoded stream, and sends the transcoded packets 110 to the non-native users 112. In one embodiment, the stream processing occurs in real time, so native users 108 and non-native users 112 receive the same multimedia content (in different formats) at the same time.

The broadcaster 102 can be any networked computing device capable of sending a real-time multimedia stream 104 to the on-demand transcoding system 100. For example, the managers of a concert or sporting event may position several cameras and microphones around an area of interest, such as a stage or field, and use a computerized control system to switch between camera angles and microphone positions in real time as the event progresses. Meanwhile, a single user who is broadcasting a self-produced media presentation (a "webcast") may use a single camera or microphone connected directly to a desktop computer. Although only one broadcaster 102 is shown in FIG. 1, the on-demand transcoding system 100 may receive real-time multimedia streams 104 from a plurality of broadcasters 102 at once, and the broadcasters 102 may connect and disconnect from the on-demand transcoding system 100 at any time. In addition, the on-demand transcoding system 100 may receive one or more real-time multimedia streams from each broadcaster 102.

When native users 108 connect to the processing system 100, the processing system 100 sends the multimedia stream 106 to the native users 108 in the stream's native format without any additional processing. In addition to supporting the broadcaster's multimedia settings, the native users 108 also support the communications protocol that the broadcaster 102 used. In one embodiment, the broadcaster 102 and native users 108 connect to the processing system 100 through the Real Time Messaging Protocol (RTMP), and client devices that do not support RTMP connect as non-native users 112, even if the client device is able to play back the stream in its native format. Despite these limitations, most desktop environments, such as user devices running Microsoft WINDOWS, Apple MAC OS X, or a Linux distribution, typically meet the requirements to connect as native users.

Non-native users 112 are users who do not meet the criteria for native users 108. They are either unable to play back the broadcaster's original multimedia stream 104 or do not support the broadcaster's communications protocol. When a non-native user 112 connects to the processing system 100, the processing system 100 receives the client device information of the new user 112. The processing system 200 also activates a discovery service that sends a directory of current multimedia streams to the user 112, and the user 112 sends a request for a stream to the discovery service. The discovery service analyzes the stream request and the user's client device information to determine whether the processing system is currently processing the requested stream into a format that is compatible with the user's client device. If the processing system 100 is already running a processing job that is transcoding the requested stream into a compatible format and packetizing the requested stream for delivery, then the processing system 100 sends the transcoded packets 110 to the non-native user 112. If the requested stream is not being processed into a compatible format at the time the request is received, the processing system 100 starts transcoding the requested stream into a compatible format, packetizing the transcoded stream, and sending the packets 110 to the requesting user.

Figure 2A:
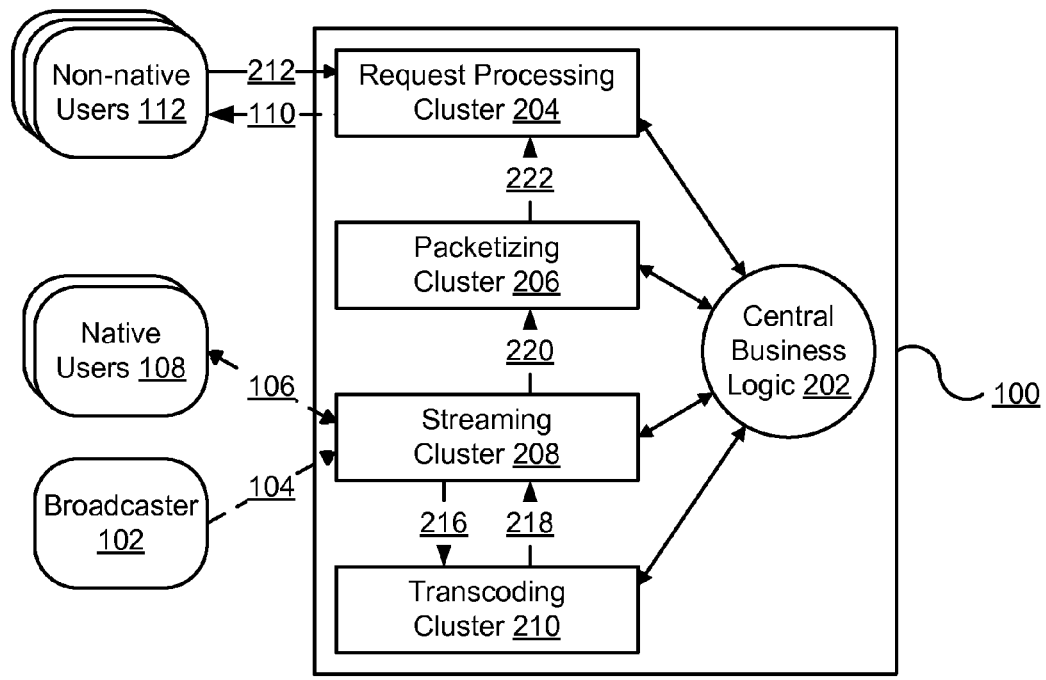
FIG. 2A is a logical architecture diagram illustrating the multimedia stream processing system, according to one embodiment.

FIG. 2A is a logical architecture diagram illustrating an on-demand multimedia stream processing system 100, according to one embodiment. The processing system 100 may include, among other components, a request processing cluster 204, a packetizing cluster 206, a streaming cluster 208, a transcoding cluster 210, and the central business logic 202. One or more of these components may be embodied in hardware, software, firmware or a combination thereof. The streaming cluster 208 establishes connections 104, 106 with the broadcasters 102 and native users 108, respectively, and the request processing cluster 204 establishes connections 110 with non-native users 112.

In the description presented with reference to FIGS. 2-7, the servers are named after their respective clusters (e.g., a transcoding server is part of the transcoding cluster 210). The four processing clusters 204, 206, 208, 210 each perform a different function in processing multimedia streams for distribution to a wide range of client devices. The central business logic 202 monitors the clusters 204, 206, 208, 210 and manages the stream conversion process.

The streaming cluster 208 receives multimedia broadcasts 104 in their native format from one or more broadcasters 102 and distributes the broadcasts to native users 108. To reduce resource load, the streaming cluster 208 supports a limited number of transfer protocols for both incoming and outgoing data. In one embodiment, the streaming cluster 208 establishes connections to broadcasters 102 and native users 108 over the Real-Time Messaging Protocol (RTMP). Although the streaming cluster 208 can send multimedia broadcasts directly to native users 108 over the multimedia connection 106, the streaming cluster 208 may also use a content delivery network (CDN) or some other content distribution system to increase bandwidth and serve more native users 108. Any additional content distribution technology in the multimedia connection 106 between the streaming cluster 208 and the native users 108 is omitted in FIG. 2 to maintain clarity.

The transcoding cluster 210 receives streams 216 for transcoding, transcodes the streams that are received, and sends the transcoded streams 218 back to the streaming cluster 208. The connections 216, 218 between the transcoding cluster 210 and the streaming cluster 208 are configured so that the transcoding cluster 210 receives streams 216 in the same manner as a native user 108 and sends streams 218 back to the streaming cluster 208 in the same manner as a broadcaster 102. On an abstract level, the transcoding cluster 210 plays two roles: (i) it acts as a native user 108 that receives streams that require transcoding; and (ii) it acts as a broadcaster 102 that sends back transcoded versions of those streams.

The streaming cluster 208 receives the transcoded streams 218 from the transcoding cluster 210 and sends the transcoded streams 220 to the packetizing cluster 206. The packetizing cluster 206 receives the transcoded streams 220 from the streaming cluster 208, splits them into short files (i.e., packets), and arranges the packets in a playlist. The packets have the same predetermined length; in one embodiment, the packets have a length of 10 seconds. The packetizing cluster 206 receives playlist requests from the central business logic 202 and sends the requested playlist and the corresponding packets 222 to the request processing cluster 204. Since non-native users 112 continue to request new packets for as long as they wish to watch the stream, the packetizing cluster 206 continuously receives requests for new packets. In addition to packetizing transcoded multimedia streams, the packetizing cluster 206 can also monitor streams for a stop condition to determine when a conversion job should be terminated. In one embodiment, the packetizing cluster 206 monitors the incoming packet requests, flags any streams that are not being requested (i.e., streams with a viewership of zero), and terminates the packetizing job for a stream if it does not receive any requests for the stream after a predetermined length of time (e.g., two minutes).

The request processing cluster 204 receives requests for processed streams from non-native users 112, retrieves the corresponding playlist and its packets 222 from the packetizing cluster 206, and sends the packets to the non-native users 112. Non-native users 112 submit stream requests to the request processing cluster 204 through a data connection 212. One of the request processing servers in the request processing cluster 204 receives the stream request and sends a request for the playlist of corresponding packets to the business logic 202. If the requested stream is already being packetized into a playlist on one of the packetizing servers, the business logic 202 instructs the request processing server to connect to that packetizing server. If the requested stream is not being packetized, the business logic 202 starts a new processing job and instructs the request processing server to connect to the packetizing server that the business logic 202 assigned to packetize the stream. In either case, the request processing server connects to the correct packetizing server and retrieves the requested playlist and packets. Next, the request processing server sends the packets to the non-native user 112 over a multimedia connection 110. Similar to the streaming cluster 208, the request processing cluster 204 may form a direct multimedia connection 110 with the non-native user, or it may use a CDN or some other distribution system can be used to increase bandwidth. Again, any additional content distribution technology in the media connection 110 is omitted from FIG. 2A to maintain clarity.

The central business logic 202 oversees and manages the overall stream conversion process that occurs on the four processing clusters 204, 206, 208, 210. The central business logic 202 maintains information on several aspects of the processing system 100, including the resource load of each server within the transcoding cluster 210 and the packetizing cluster 206, the transcoding and packetizing jobs being performed on those clusters 206, 210, and the multimedia streams that the streaming cluster 208 is receiving from broadcasters. In one embodiment, the central business logic 202 updates all of this information in real time either by polling the clusters 204, 206, 208, 210 at regular intervals or by having the clusters 204, 206, 208, 210 push changes to the central business logic 202 as soon as they occur.

The central business logic 202 also plays a role in starting and stopping conversion jobs. When a new processing job is to be initiated for a multimedia stream, the central business logic 202 uses its resource load information to assign the stream to transcoding and packetizing servers with lighter than average loads. Assigning a multimedia stream to servers based on resource load information prevents individual transcoding and packetizing servers from becoming overloaded, and since the resource load information is stored locally on the central business logic 202, the assignment process can be performed with low latency.

A processing job may be terminated when one of several possible stop conditions are satisfied. For example, if the packetizing server detects that the number of users receiving a processed stream has dropped to zero for a predetermined length of time (e.g., 2 minutes), the packetizing server informs the central business logic 202 that the packetizing server has terminated a packetizing job due to a lack of viewership. The central business logic 202 also maintains a record of active transcoding jobs so that it can instruct the corresponding transcoding server to stop transcoding the stream without querying another entity for additional information. Alternatively, the central business logic 202 may instruct the appropriate servers to stop transcoding and packetizing a multimedia stream if the central business logic 202 detects that the broadcaster for the stream has disconnected from the streaming server. Again, the commands to stop transcoding and packetizing a stream can be sent to the appropriate servers with low latency because the business logic 202 maintains an up-to-date record of active transcoding and packetizing jobs and the servers on which the transcoding and packetizing jobs are being executed.

Figure 2B:
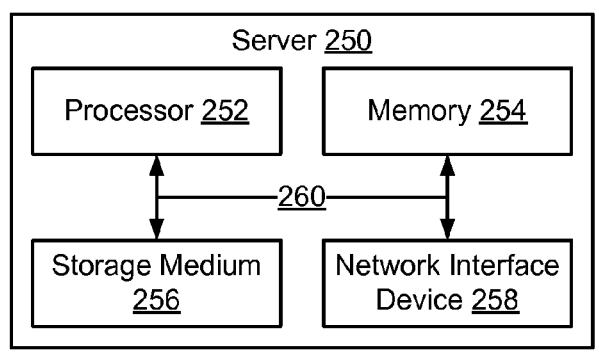
FIG. 2B is a block diagram illustrating a server within one of the processing clusters within the multimedia stream processing system, according to one embodiment.

FIG. 2B is a block diagram illustrating a server 250 within one of the clusters 204, 206, 208, 210. Each cluster 204, 206, 208, 210 contains a plurality of servers 250, and servers 250 within the same cluster 204, 206, 208, 210 operate in parallel to perform the same task. For example, the packetizing cluster 206 might contain a plurality of packetizing servers, and each of the packetizing servers might be assigned to packetize a different set of multimedia streams. The central business logic 202 may also be embodied as one or more servers 250. In other embodiments, one or more of the clusters 204, 206, 208, 210 may include a single server 250 instead of a plurality of servers 250, and any single server 250 may perform the functions of more than one component 202, 204, 206, 208, 210 in the processing system 100.

A server 250 contains a processor 252, memory 254, a storage medium 256, and a network interface device 258 that are communicatively coupled to each other through connections 260. The processor 252 may be any hardware device that is capable of executing machine-readable instructions and communicating with the memory 254, storage medium 256, and network interface device 258. Examples of processors 252 may include chip implementations such as the Intel PENTIUM, CORE i-series, ITANIUM, XEON, AMD SEMPRON, ATHLON, TURION, or FUSION. The processor 252 may also include graphics card-based processing units, such as the NVIDIA GEFORCE, QUADRO, or TESLA. Although only one processor 252 is pictured, multiple processors 252 may be used in parallel within a single server 250 to increase computing performance for tasks where large-scale parallelization is possible (e.g., transcoding several multimedia streams at once). The memory 254 is a dynamic computer-readable storage medium, such as random access memory (RAM). The storage medium 256 is a non-volatile computer-readable storage medium, such as a solid state drive (SSD), hard disk drive (HDD), or compact disc (CD). The storage medium loaded 256 is loaded with machine-readable instructions that, when run, cause the one or more processors 252 to perform the tasks described below. The network interface device 258 exchanges data from other servers, clusters, modules, users, or any other entities that may interact with or be part of the multimedia stream processing system. Although all four components 252, 254, 256, 258 are pictured inside a single server 250, one or more of the components 252, 254, 256, 258 may be also placed outside of the server 250 and communicatively coupled to the other components through the network interface device 258 or a different external connection.

Figure 3:
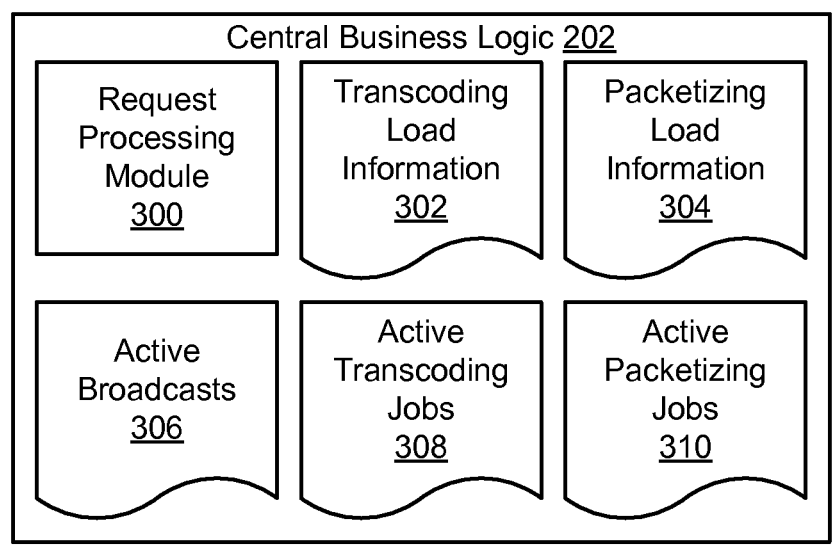
FIG. 3 is a block diagram illustrating the central business logic within the multimedia stream processing system, according to one embodiment.

FIG. 3 is a block diagram illustrating the central business logic 204 within the conversion system 100, according to one embodiment. The central business logic 204 may contain, in addition to other components, a request processing module 300, load information for the transcoding servers 302, load information for the packetizing servers 304, a list of broadcasts currently being received 306, a list of transcoding jobs currently taking place 308, and a list of packetizing jobs currently taking place 310.

The transcoding load information 302 contains a record of the resource load on each transcoding server in the transcoding cluster 210. The load information for each transcoding server may contain, among other things, the usage levels of the processor 252, memory 254, storage medium 256, or network interface device 258. Similarly, the packetizing load information 304 contains a record of the resource load on each packetizing server in the packetizing cluster 206. The load information for each packetizing server may also contain, among other things, the usage levels of the processor 252, memory 254, storage medium 256, or network interface device 258.

The list of active broadcasts 306 contains a record of the multimedia streams that the streaming cluster 208 is receiving from broadcasters 102. An entry for a multimedia stream in the list of active broadcasts 306 may contain, among other information, a title for the stream, a short description of the stream, the name of the stream's broadcaster, and a start time for the broadcast. The list of active transcoding jobs 308 contains a record of the multimedia streams being transcoded on the transcoding cluster 210. An entry for an active transcoding job may contain, among other information, a transcoding job descriptor and an identifier for the transcoding server where the transcoding job is being executed. The list of active packetizing jobs 310 contains a record of the transcoded multimedia streams that are being packetized on the packetizing cluster 206. An entry for an active packetizing job may contain, among other information, a first identifier for the multimedia stream being packetized and a second identifier for the packetizing server where the packetizing job is being executed.

The central business logic 202 may also continuously update the data 302, 304, 306, 308, 310 describing the processing clusters 204, 206, 208, 210 to ensure that the data 302, 304, 306, 308, 310 remains accurate. Continuous updating is advantageous, among other reasons, because the activity on the processing clusters 204, 206, 208, 210 may be subject to significant changes within a short period of time if there is a large amount of activity from the users 108, 112 and broadcasters 102. The central business logic 202 can maintain the data 302, 304, 306, 308, 310 by either polling the processing clusters 204, 206, 208, 210 at regular intervals (e.g., every 1 second) or by having the processing clusters 204, 206, 208, 210 push changes to the central business logic 202 as the changes are made. Sometimes, the central business logic 202 will be the entity that makes changes to the data 302, 304, 306, 308, 310 so it is not necessary for the central business logic 202 to interact with any of the processing clusters 204, 206, 208, 210 to receive updated data 302, 304, 306, 308, 310. For example, the central business logic 202 may create a new entry in the list of active packetizing jobs 310 when the central business logic 202 initiates a new packetizing job.

The request processing module 300 receives requests for packet playlists from a request processing server and instructs the request processing server to retrieve the playlist from the packetizing server that has been assigned to packetize the requested stream. After receiving a request for a playlist, the request processing module 300 checks the list of active packetizing jobs 310 to determine whether the requested playlist is already being packetized on a packetizing server. If a packetizing job for the requested playlist is found in the list of active packetizing jobs 310, then the request processing module 300 identifies the packetizing server that is being used to execute the packetizing job and instructs the request processing server to retrieve the playlist from that packetizing server. If a packetizing job for the requested playlist is not found in the list of active packetizing jobs 310, then the request processing module 300 uses the packetizing load information 304 to assign a packetizing server to create the requested playlist packet. The request processing module 300 follows a similar process to assign a transcoding server to transcode the requested multimedia stream using the transcoding load information 302. The process of assigning new transcoding and packetizing jobs to the appropriate servers is described in more detail in conjunction with FIG. 6. After the request processing module 300 has assigned the packetizing job to a packetizing server, it adds the new packetizing job to the list of active packetizing jobs 310 and instructs the request processing server to connect to the assigned packetizing server.

Figure 4:
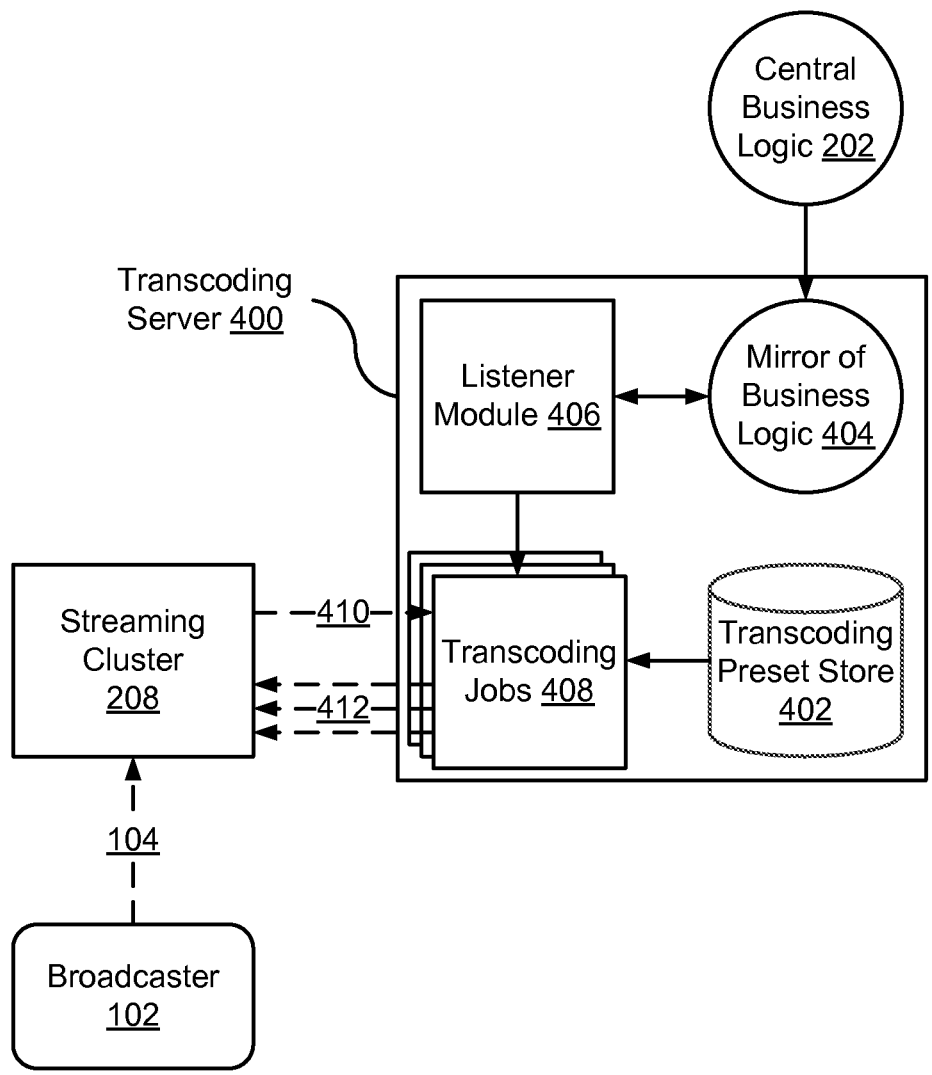
FIG. 4 is a logical architecture diagram illustrating a transcoding server within the multimedia stream processing system, according to one embodiment.

FIG. 4 is a logical architecture diagram illustrating a transcoding server 400 in the transcoding cluster 210 of the conversion system 100, according to one embodiment. The transcoding server 400 may include, in addition to other components, a transcoding preset store 402, a local mirror of the central business logic 404, a listener module 406, and one or more transcoding jobs 408.

The transcoding preset store 402 contains transcoding presets that are used for the transcoding jobs 408. A transcoding preset contains information that defines a multimedia format. For example, a video preset may specify a codec, a bit rate, a resolution, and a frame rate. An audio preset may specify a codec, a bit rate, frequency and channel number transponding, and any additional audio filtering. Although most transcoding jobs 408 will use both audio and video presets, it is also possible for a transcoding job to exclusively use audio presets (i.e., the native stream does not contain video, or the native stream contains video that is not to be transcoded) or video presets (i.e., the native stream does not contain audio, or the native stream contains audio that is not to be transcoded). Additionally, some of the presets may apply to forms of multimedia that are not categorized as audio or video.

Each transcoding server 400 may maintain a local mirror 404 of the entire central business logic 202, including the list of active transcoding jobs 308. The transcoding server 400 can maintain the mirror of the business logic 404 by sending periodic polling requests to the central business logic 202 or by having the central business logic 202 push changes down to the transcoding server 400. The listener module 406 monitors the mirror of the business logic 404 for new entries in the list of active transcoding jobs 308. In one embodiment, the listener module 406 polls the business logic mirror 404 at regular intervals (e.g., every 1 second). The mirror of the business logic 404 is stored locally so that the communication between the listener module 406 and the business logic mirror 404 occurs with low latency.

When the listener module 406 detects a new entry in the list of active transcoding jobs 308, the listener module 406 analyzes the transcoding server identifier in the new entry to determine whether the new transcoding job was assigned to the transcoding server 400 on which the listener module 406 resides. If the transcoding server identifier matches the transcoding server 400, the listener module 406 uses the transcoding job descriptor in the new entry to initiate the new transcoding job 408 on the transcoding server. The transcoding job descriptor contains information to fully define a transcoding job 408, including, among other items, an identifier for the stream that will be transcoded, identifiers that will be assigned to the transcoded streams, and references to transcoding presets that will be used for the transcoded streams.

The transcoding job 408 retrieves the referenced transcoding presets from the transcoding preset store 402. The transcoding job 408 also retrieves the multimedia stream to be transcoded 410 from the streaming cluster 208. In one embodiment, the multimedia stream to be transcoded 410 contains both audio and video, and the transcoding job 408 uses multiple audio and video presets in the transcoding preset store 402 to transcode the original stream 410 into a plurality of transcoded streams 412. The transcoding job 408 may use separate modules to transcode the audio and video components of the multimedia stream, or it may use the same module to transcode both components. After the transcoding process starts, the transcoding job 408 sends the transcoded streams 412 back to the streaming cluster.

The listener module 406 can also terminate transcoding jobs 408. A transcoding job 406 on a transcoding server 400 is terminated when the listener module 406 detects that an entry in the list of active transcoding jobs 308 on the business logic mirror 404 corresponding to one of the transcoding jobs 408 has been removed. For example, an entry in the list of active transcoding jobs 308 may be removed, thus terminating the transcoding job 408, when the transcoded multimedia streams corresponding to the entry are no longer being requested by any non-native users 112. By stopping transcoding jobs 408 when user demand no longer exists, the computing resources on each transcoding server 400 are used more efficiently.

Demand-Based Management of Processing Jobs

Figure 5:
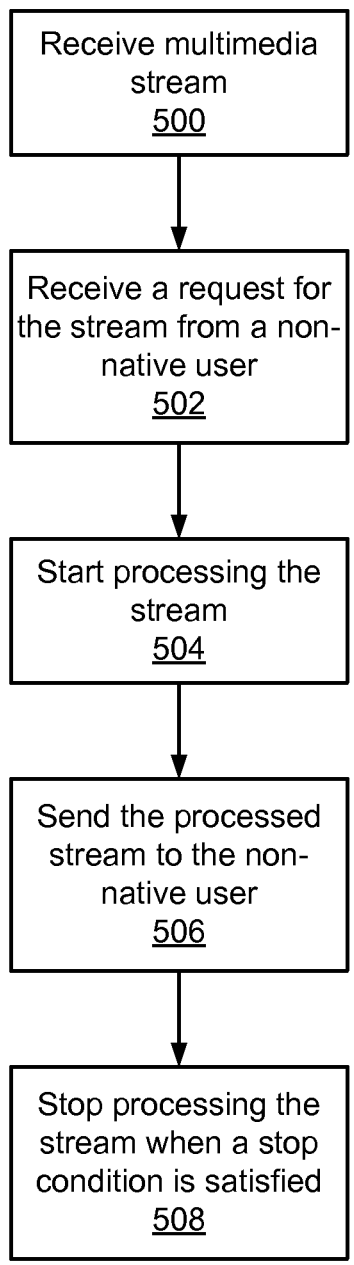
FIG. 5 is a flow chart illustrating the process of starting and stopping a stream processing job based on user demand, according to one embodiment.
Figure 6:
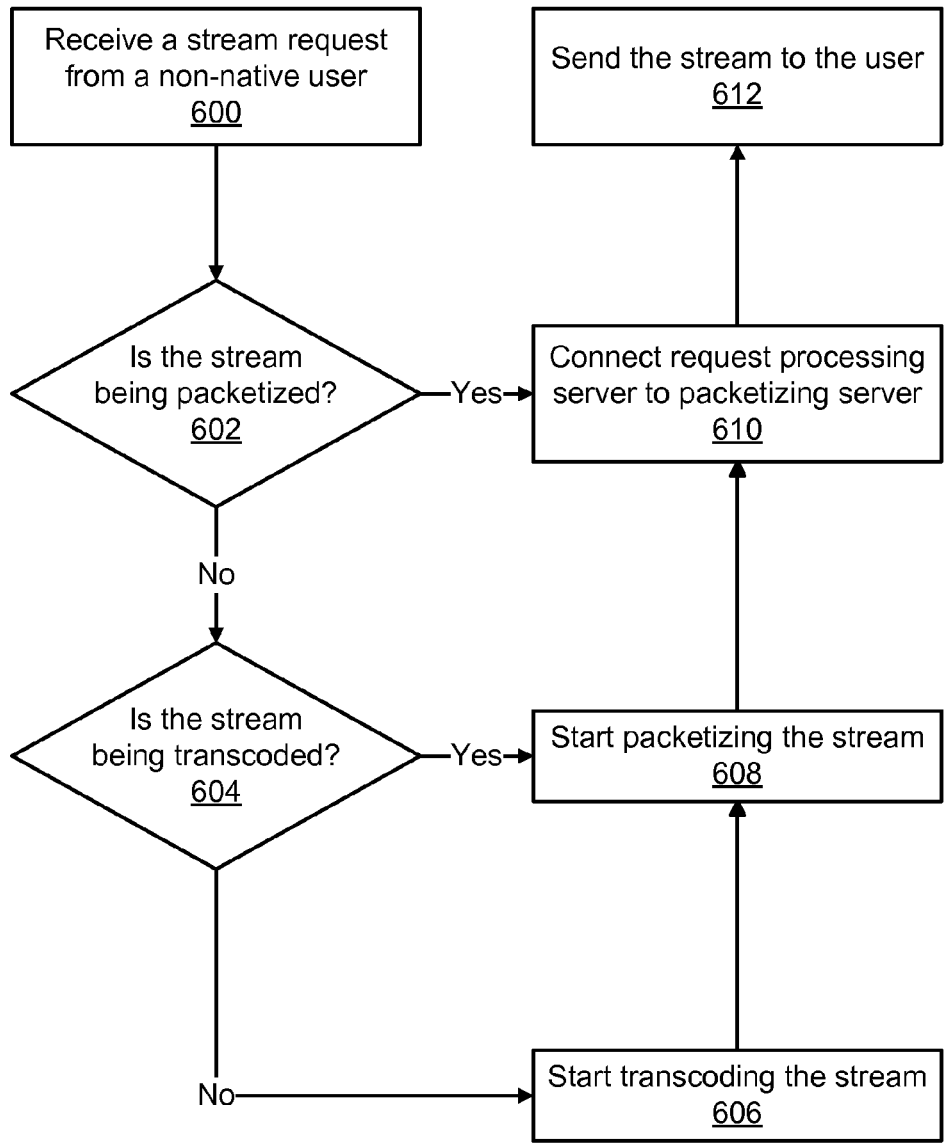
FIG. 6 is a flow chart illustrating the process of starting a processing job responsive to a user request, according to one embodiment.
Figure 7:
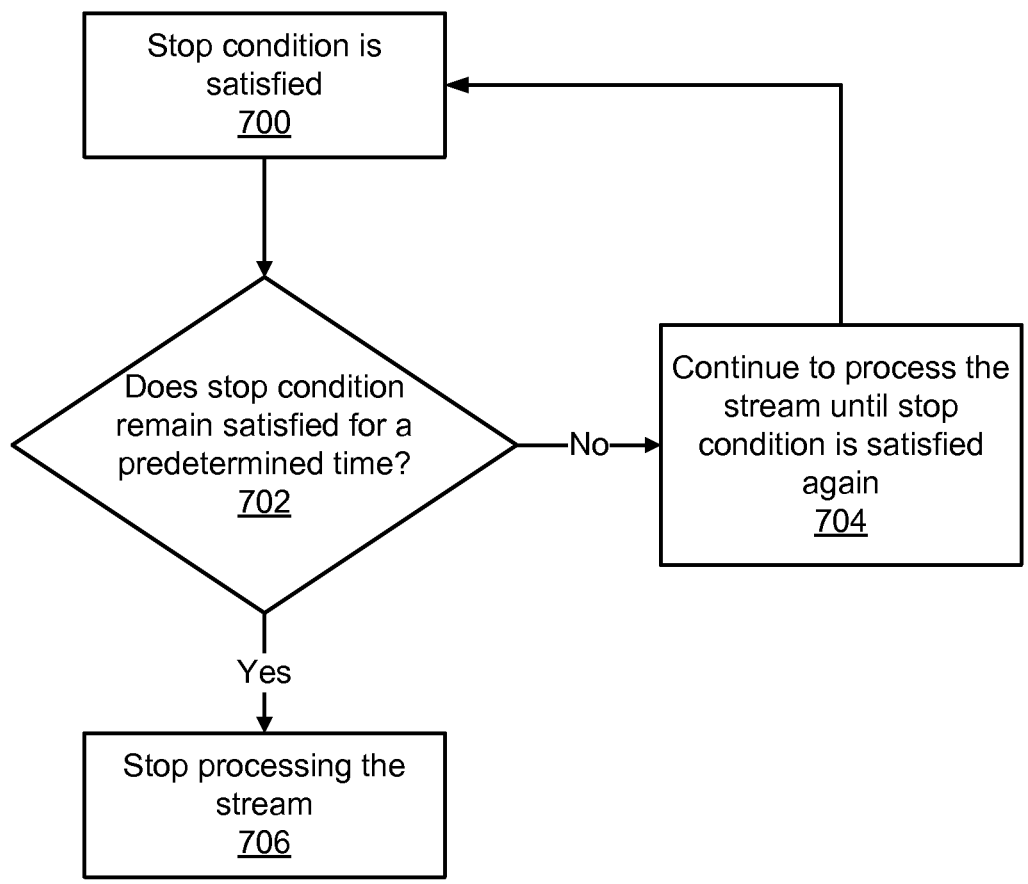
FIG. 7 is a flow chart illustrating the process of stopping a processing job responsive to satisfying a stop condition, according to one embodiment.

FIGS. 5 through 7 illustrate processes for starting and stopping processing jobs for multimedia streams based on user demand. FIG. 5 is a flow chart illustrating an overall process for starting and stopping a processing job for a multimedia stream, according to one embodiment. The process begins when the streaming cluster 208 receives 500 a multimedia stream in a native format from a broadcaster 102. The multimedia stream can be transferred over any transfer protocol that is supported by both the broadcaster 102 and the streaming cluster 208. In one embodiment, the broadcaster 102 sends the native multimedia stream to the streaming cluster 208 over the Real Time Messaging Protocol (RTMP). After the streaming cluster 208 starts receiving 500 the native multimedia stream, the streaming cluster 208 may send the native multimedia stream to native users 108 without additional processing.

Next, a non-native user 112 may connect to the request processing cluster 204 and submit a request for the multimedia stream. The request processing cluster 204 receives 502 the request and queries the packetizing cluster 206 for the corresponding playlist of transcoded packets. In one embodiment, the playlist query is sent directly from the request processing cluster 204 to the packetizing cluster 206. In another embodiment, the playlist query is sent to the central business logic 202, and the central business logic 202 searches the list of active packetizing jobs 310 to determine whether the requested playlist is being created on the packetizing cluster 206. If the packetizing cluster 206 or the central business logic 202 determines that the requested playlist of packets is not currently being created on the packetizing cluster 206, then the central business logic 202 starts 504 a new processing job for the requested multimedia stream by assigning the stream to a transcoding server and a packetizing server. The process of starting 504 a new processing job for a requested multimedia stream is described in more detail with reference to FIG. 6.

After the central business logic 202 starts 504 the processing job for the requested multimedia stream, the central business logic 202 instructs the request processing cluster 204 to retrieve a playlist of transcoded packets from the packetizing cluster 206 and send 506 the packets to the non-native user 112. After the request processing cluster 204 starts sending packets to the non-native user 112, the non-native user 112 continues to send requests for additional packets to the request processing cluster 204 until the non-native user 112 no longer wishes to receive the multimedia stream. The request processing cluster 204 stops sending packets to the non-native user 112 when the request processing cluster 204 stops receiving packet requests from the non-native user 112.

In one embodiment, the packetizing cluster 206 may wait for a predetermined period of time after it starts packetizing the requested stream before sending the transcoded packets to the request processing cluster 204. The delay enables the packetizing cluster 206 to accumulate a buffer of packets before the request processing cluster 204 sends the packets to the user. In some embodiments, the delay has a length of 30 seconds, which allows the packetizing cluster 206 to accumulate a buffer of three 10-second packets. During the delay, the packetizing cluster 206 sends an empty playlist to the request processing cluster 204. In response to receiving the empty playlist, the request processing cluster 204 sends the user a different multimedia stream with the same length as the delay (or a series of different multimedia streams whose total length matches the length of the delay). The different multimedia stream may contain revenue generating content (e.g., advertising).

After the request processing cluster 204 starts sending 506 transcoded packets of the requested multimedia stream to one or more non-native users 112, the multimedia stream distribution system 100 starts monitoring for one or more stop conditions. When a stop condition is satisfied, the multimedia stream distribution system 100 stops 508 the processing job for the requested multimedia stream. In one embodiment, one possible stop condition is defined as the absence of packet requests for a multimedia stream for a predetermined length of time (e.g., 2 minutes). Since a non-native user 112 continues to submit packet requests until the non-native user 112 no longer wishes to receive the multimedia stream, an absence of packet requests indicates that the audience of the requested multimedia stream has dropped to zero users. Another possible stop condition may be satisfied when the broadcaster 102 of the multimedia stream disconnects from the multimedia stream distribution system. The process of stopping 508 a processing job is described in further detail below in conjunction with FIG. 7.

In other embodiments, some of the steps shown in FIG. 5 may occur in a different sequence or in parallel, and some steps may be omitted. For example, the central business logic may start 504 a processing job for a multimedia stream either before or in parallel with receiving 502 a request for the multimedia stream from a non-native user 112. This may be useful for a popular multimedia stream that is expected to receive many requests from non-native users 112 soon after the multimedia stream processing system 100 starts receiving 500 the multimedia stream from the broadcaster 102. Additionally, the multimedia stream distribution system 100 may delay or omit the step of monitoring for the stop condition and stopping 508 the processing job when the stop condition is satisfied. Again, the absence of this step may be useful for a popular multimedia stream that is not expected to trigger the stop condition. By delaying or omitting the stop of monitoring for the stop condition because the stop condition is unlikely to be satisfied, the multimedia stream processing system 100 can reduce its resource use or assign those resources to other tasks.

FIG. 6 is a flow chart illustrating in more detail an example process for starting a processing job for a multimedia stream responsive to a non-native user's request for the stream, according to one embodiment. The process begins the request processing cluster 204 receives 600 a request for a multimedia stream from a (non-native) requesting user 112. The request processing cluster 204 forwards the request to the central business logic 202, and the request processing module 300 in the central business logic 300 checks the list of active packetizing jobs 310 to determine 602 whether the requested stream is currently being packetized. If the request processing module 300 does not find a packetizing job for the requested stream, then the request processing module 300 checks the list of active transcoding jobs 308 to determine 604 whether the request stream is currently being transcoded into a format suitable for playback on the requesting user's client device. If the request processing module 300 does not find a suitable a transcoding job for the requested stream, then the request processing module 300 starts transcoding 606 the requested stream. If the list of active transcoding jobs 308 indicates that a transcoding job exists for the requested stream but does not include a format suitable for playback on the requesting user's client device, then the request processing module 300 terminates the existing transcoding job and restarts the transcoding 606 of the requested stream with a new transcoding job that includes a suitable format.

To start transcoding 606 the requested stream, the request processing module 300 in the central business logic 202 uses the transcoding load information 302 to choose a transcoding server. In one embodiment, the request processing module uses load metrics well-known in the art (e.g., processor load, memory use, available network bandwidth, etc) to select a transcoding server 400 with a lower than average load. After the request processing module 300 selects a transcoding server 400, the request processing module 300 adds a new entry to the list of active transcoding jobs 308. The new entry contains, among other things, a transcoding job descriptor and the identifier of the selected transcoding server 400. The updated list of active transcoding jobs 308 is automatically copied to the business logic mirror 404 on each transcoding server 400 in the transcoding cluster 210, and the listener module 406 on each transcoding server 400 detects the new entry in the list of transcoding jobs 308.

Each listener module 406 checks the transcoding server identifier in the new entry. If the transcoding server identifier matches the transcoding server 400 on which the listener module 406 resides, the listener module 406 uses the transcoding job descriptor in the new entry to create a new transcoding job 408 on the transcoding server 400. In one embodiment, each transcoding server 400 has a unique identifier, so the transcoding job is only created and executed on one transcoding server 400 to make more efficient use of computing resources. In an alternative embodiment, some transcoding servers 400 share the same identifier, so the transcoding job is created and executed on multiple transcoding servers 400 for redundancy. This method of having the listener module 406 on each transcoding server 400 creates new transcoding jobs responsive to new entries in the list of active transcoding jobs 308 on the business logic mirror 404 allows the central business logic 202 to control the transcoding servers 400 without having to send commands directly to the connection servers 400, thus freeing up processing power on the central business logic 202 for other tasks.

After the selected transcoding server 400 starts executing 606 the transcoding job, or after the central business logic 202 determines 604 that a suitable transcoding job is already being executed on a transcoding server, the request processing module 300 starts packetizing 608 the requested multimedia stream. Similar to the process for choosing a transcoding server 400, the request processing module 300 chooses a packetizing server for the new packetizing job by analyzing the packetizing load information 304. Again, the request processing module 300 uses load metrics well-known in the art to select a packetizing server with lower than average load. After the request processing module 300 selects a packetizing server, the request processing module 300 adds a new entry to the list of active packetizing jobs 310 to indicate that the new processing job has been assigned to the selected packetizing server. Next, the request processing module 300 instructs the selected packetizing server to start packetizing 608 the transcoded multimedia stream.

After the packetizing server starts packetizing 608 the transcoded multimedia stream, or after the request processing module 300 determines 602 that a packetizing job is already running on a packetizing server, the request processing module 300 instructs 610 the request processing server that received the multimedia stream request to connect to the packetizing server that is running the packetizing job for the requested multimedia stream. The connection allows the packetizing server to send the transcoded packets to the request processing server, and the request processing server can then send 612 the transcoded packets to the non-native user 122.

In an alternative embodiment, the multimedia stream processing system 100 may start transcoding 606 and packetizing 608 the multimedia stream without receiving 600 any stream requests from non-native users 112. However, the multimedia stream processing system 100 still waits to receive 600 at least one request from a non-native user before perform it can perform the steps of connecting 610 the request processing server to the packetizing server and sending 612 the packetized stream to the user.

FIG. 7 is a flow chart illustrating in more detail an example process for stopping a processing job for a multimedia stream responsive to satisfying a stop condition, according to one embodiment. Multiple stop conditions may be defined, and the multimedia stream processing system 100 monitors one or more of the processing system's subcomponents to determine whether any of the stop conditions are satisfied 700 for any of the processing jobs that are being executed. In one embodiment, the packetizing cluster 204 monitors incoming packet requests for each multimedia stream that is being packetized on one of the packetizing servers, and one stop condition is satisfied 700 when a multimedia stream no longer receives any requests (i.e., the audience for the multimedia stream has dropped to zero).

After the stop condition for a processing job is satisfied 700, the multimedia stream processing system 100 continues to monitor the stop condition to determine 702 whether the stop condition remains satisfied for a predetermined length of time. During this predetermined length of time, the processing job remains active on the transcoding server and the packetizing server. In the embodiment described above, the packetizing server waits for two minutes. During the two minute waiting period, both the packetizing job and the transcoding job for the multimedia stream remain active, and the packetizing server continues monitoring for new packet requests for the multimedia stream.

If the stop condition does not remain satisfied over the predetermined length of time, then the multimedia stream processing system 100 continues 704 to process the stream until the stop condition is satisfied again. In the embodiment where the stop condition is satisfied when the packetizing cluster 204 stops receiving packet requests for a multimedia stream, the transcoding and packetizing jobs would continue uninterrupted if a packet request for the multimedia stream is received during the two minute waiting period.

If the stop condition does remain satisfied over the predetermined length of time, then the multimedia stream processing system 100 stops 706 the processing job. In the above embodiment, the packetizing server stops the packetizing job if no packet requests have been received after two minutes. After the packetizing job is stopped, the packetizing server informs the central business logic 202 that the audience for the multimedia stream has dropped to zero for an extended length of time. The central business logic 202 responds by removing the corresponding entry from the list of active transcoding jobs 308. The removal is copied to the business logic mirror 404 on each transcoding server 400. When the listener module 406 on the transcoding server 400 that was executing the removed transcoding job detects the removal, the listener module 406 terminates the transcoding job 408. The resources on the transcoding server and the packetizing server are now free to be assigned to other jobs, and the transcoding load information 302 and packetizing load information 304 are updated to reflect the freed resources. By dynamically terminating unneeded processing jobs, the multimedia stream processing system 100 can use its computing resources more efficiently and provide a more streamlined experience for both native 108 and non-native viewers 112.

In other embodiments, the multimedia stream processing system 100 may stop 706 processing the stream after a stop condition is satisfied 700 without waiting to determine 702 whether the stop condition remains satisfied for a predetermined time. For example, a second stop condition may be satisfied when the broadcaster 102 disconnects from the multimedia stream processing system 100. If the broadcaster 102 disconnects, the multimedia stream processing system 100 can no longer receive a multimedia stream from the broadcaster 102, so the processing job for the stream is stopped 706 without waiting 702 for a predetermined time. Since multiple stop conditions may be defined in the same embodiment, the multimedia stream processing system 100 may simultaneously monitor the packetizing cluster 206 for multimedia streams that are no longer receiving packet requests and monitor the list of active broadcasts 306 for broadcasters 102 who disconnect. The multimedia stream processing system 100 may also monitor components for other stop conditions that were not described in conjunction with FIG. 7.

The configurations described in the preceding description have several benefits and advantages over other methods of video processing. Since the processing is performed on a server, there is no need for the broadcaster to obtain the considerable computing resources needed to simultaneously transcode and packetize a multimedia stream into multiple formats. This allows broadcasters with lower budgets to broadcast their content to a wider audience of users on different types of devices. In addition, the ability to start and stop processing jobs based on changes in user demand, as described with reference to FIGS. 5, 6, and 7, allows the processing system 100 to use its computing resources more efficiently. As a result, the processing system 100 is able to manage a higher number of simultaneous active broadcasts 104 from multiple broadcasters 102 while still providing a reliable experience for users 112 who are receiving a processed multimedia stream 110.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, with reference to FIGS. 2A, 2B, 3, and 4. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor, such as the processor 252 shown in FIG. 2B) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors (e.g., the processor 252 shown in FIG. 2B) that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors (e.g., the processor 252 in FIG. 2B), not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification, such as the processes described with reference to FIGS. 5, 6, and 7, are presented in terms of algorithms or symbolic representations of operations on data stored as bits or binary digital signals within a machine memory (e.g., a computer memory such as the memory 254 in FIG. 2B). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for analyzing user demand to process multimedia streams into different formats through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of transcoding streaming multimedia items, the method comprising:

at a computing device, receiving a plurality of streaming multimedia items in a first format from a plurality of broadcasters, wherein one or more streaming multimedia items is received from each broadcaster;

for each of the received streaming multimedia items:

receiving requests from a plurality of remote user devices for each of the streaming multimedia items;

responsive to detecting that one or more of the requesting remote user devices is not capable of reproducing each of the streaming multimedia items in the first format, transcoding each of the streaming multimedia items into a second format, the second format differing from the first format in at least one multimedia setting;

packetizing each of the transcoded streaming multimedia items into multimedia packets of a predetermined length;

waiting another predetermined length of time before sending the multimedia packets to the remote user devices;

sending a multimedia stream or a series of multimedia streams other than the transcoded stream to the remote user devices during the other predetermined length of time;

transferring the multimedia packets to the plurality of requesting remote user devices over a network, each of the transcoded streaming multimedia items in the multimedia packets capable of being reproduced on the plurality of remote user devices; and stopping the transcoding of each of the streaming multimedia items responsive to satisfying a stop condition on the computing device, the stop condition comprising detecting that no remote users have been receiving each of the transcoded streaming multimedia items for at least a predetermined length of time.

2. The method of claim 1, wherein one or more of the streaming multimedia items is not transcoded responsive to detecting that each of the plurality of requesting remote user devices is capable of reproducing the streaming multimedia items in the first format.

3. The method of claim 1, wherein the computing device receives the streaming multimedia items in real-time.

4. The method of claim 3, wherein the computing device transcodes the streaming multimedia items and transfers the streaming multimedia items to the plurality of requesting remote user devices in real-time.

5. The method of claim 1, further comprising receiving information describing the multimedia playback capabilities of the remote user devices.

6. The method of claim 5, further comprising choosing multimedia formats that are capable of being played back by the requesting remote users as the second format based on analysis of the information describing the multimedia playback capabilities of the requesting remote user devices.

7. The method of claim 1, wherein the stop condition further comprising detecting that the broadcaster for each of the streaming multimedia items has disconnected.

8. The method of claim 1, further comprising checking a list of active transcoding jobs or packetizing jobs at the computing device before each transcoding the streaming multimedia items responsive to detecting that the one or more of the requesting remote user devices is not capable of reproducing each of the streaming multimedia items in the first format.

9. The method of claim 1, further comprising transferring each of the streaming multimedia items in the first format to the plurality of requesting remote user devices over a network responsive to detecting that one or more of the requesting remote user devices is capable of reproducing each of the streaming multimedia items in the first format.

10. A computing system for transcoding streaming multimedia items, the computing system comprising:

a streaming component comprising a first network interface coupled to a network and configured to receive a plurality of streaming multimedia items in a first format from a plurality of broadcasters, wherein one or more streaming multimedia items is received from each broadcaster;

a transcoding component comprising a first processor and a first memory coupled to the first processor, the first processor configured to execute instructions to transcode the streaming multimedia items into a second format, the second format differing from the first format in at least one multimedia setting, the transcoding component further configured to stop the transcoding of the streaming multimedia items responsive to satisfying a stop condition on the computing system;

a packetizing component configured to packetize the transcoded streaming multimedia items into multimedia packets of a predetermined length; and a request processing component comprising a second network interface, a second processor, and a second memory, the second memory coupled to the second processor, the second processor configured to:

execute instructions to receive requests from a plurality of remote user devices for the streaming multimedia items via the second network interface, wait another predetermined length of time before sending the multimedia packets to the remote user devices, send a multimedia stream or a series of multimedia streams other than the transcoded stream to the remote user devices during the other predetermined length of time, and transfer the multimedia packets to the plurality of requesting remote user devices over a network via the second network interface, the transcoded streaming multimedia items in the multimedia packets capable of being reproduced on the plurality of remote user devices, the stop condition for a streaming multimedia item satisfied when the computing device detects that no remote users have been receiving the transcoded streaming multimedia item for a predetermined length of time.

11. The system of claim 10, wherein the transcoding system is further configured not to transcode one or more of the streaming multimedia items responsive to detecting that each of the plurality of requesting remote user devices is capable of reproducing the streaming multimedia items in the first format.

12. The system of claim 10, wherein the streaming component is further configured to receive the streaming multimedia items in real-time.

13. The system of claim 12, wherein the transcoding component is further configured to transcode the streaming multimedia items in real-time.

14. The system of claim 12, wherein the request processing component is further configured to transfer the streaming multimedia items to the plurality of requesting remote user devices in real-time.

15. The system of claim 10, wherein the request processing component is further configured to receive information describing the multimedia playback capabilities of the remote user devices.

16. The system of claim 15, wherein the transcoding component chooses multimedia formats that are capable of being played back by the requesting remote users as the second format based on analysis of the information describing the multimedia playback capabilities of the requesting remote user devices.

17. The system of claim 10, wherein the stop condition for the streaming multimedia item is further satisfied when the computing device detects that the broadcaster for the streaming multimedia item has disconnected.

18. A non-transitory computer readable medium configured to store instructions, the instructions when executed by a processor cause the processor to:

receive a plurality of streaming multimedia items in a first format from a plurality of broadcasters, wherein one or more streaming multimedia items is received from each broadcaster;

for each of the received streaming multimedia items:

receive requests from a plurality of remote user devices for each of the streaming multimedia items;

responsive to detecting that one or more of the requesting remote user devices is not capable of reproducing each of the streaming multimedia items in the first format, transcode each of the streaming multimedia items into a second format, the second format differing from the first format in at least one multimedia setting;

packetize each of the transcoded streaming multimedia items into multimedia packets of a predetermined length;

wait another predetermined length of time before sending the multimedia packets to the remote user devices;

send a multimedia stream or a series of multimedia streams other than the transcoded stream to the remote user devices during the other predetermined length of time;

transfer the multimedia packets to the plurality of requesting remote user devices over a network, each of the transcoded streaming multimedia items in the multimedia packets capable of being reproduced on the plurality of remote user devices; and stop the transcoding of each of the streaming multimedia items responsive to satisfying a stop condition on the computing device, the stop condition comprising detecting that no remote users have been receiving each of the transcoded streaming multimedia items for at least a predetermined length of time.

19. The computer readable medium of claim 18, wherein one or more of the streaming multimedia items is not transcoded responsive to detecting that each of the plurality of requesting remote user devices is capable of reproducing the streaming multimedia items in the first format.

\* \* \* \* \*